United States Patent [19]

Miura

[11] Patent Number: 4,647,377
[45] Date of Patent: Mar. 3, 1987

[54] FILTER APPARATUS

[75] Inventor: Kikuzo Miura, Shizuoka, Japan

[73] Assignee: Kabushiki Kaisha Ito Tekkousho, Shimizu, Japan

[21] Appl. No.: 683,185

[22] Filed: Dec. 18, 1984

[30] Foreign Application Priority Data

Jul. 24, 1984 [JP] Japan .................. 59-111021[U]

[51] Int. Cl.$^4$ ............................................. B01D 29/28
[52] U.S. Cl. ................................ 210/323.2; 210/332; 210/339; 210/346; 210/356; 210/452; 210/512.3; 210/500.23
[58] Field of Search ............... 210/780, 785, 787, 788, 210/805, 195.2, 196, 304, 305, 306, 319, 320, 321.1, 322, 323.1, 323.2, 324, 329, 332, 354, 356, 357, 359, 388, 405, 407, 420, 451, 452, 456, 500.23, 509, 512.1, 512.3, 500.21, 339, 346, 486, 409

[56] References Cited

U.S. PATENT DOCUMENTS

| 4,075,100 | 2/1978 | Furuta et al. | 210/456 |
| 4,125,468 | 11/1978 | Joh et al. | 210/456 |
| 4,201,673 | 5/1980 | Kanno et al. | 210/456 |
| 4,219,426 | 8/1980 | Spekle et al. | 210/456 |
| 4,220,535 | 9/1980 | Leonard | 210/456 |
| 4,267,053 | 5/1981 | Hashino et al. | 210/321.1 |

FOREIGN PATENT DOCUMENTS 79357 10/1973 Japan .
71615 5/1982 Japan .

OTHER PUBLICATIONS

Hackh's Chemical Dictionary, 4th Edition, 1969, pp. 168 & 207.
The Random House College Dictionary, revised edition, 1980, pp. 366-367.

Primary Examiner—Richard V. Fisher
Assistant Examiner—Wanda L. Millard
Attorney, Agent, or Firm—Leonard Bloom

[57] ABSTRACT

A filter apparatus has a filter housing having suspended therein a filter element. The filter element includes a plurality of hollow threads made from a high molecular weight polymeric material. The threads are characterized by being porous and flexible as well as being closed at the bottom. The filter apparatus further has at least one baffle within the housing to cause turbulence in the liquid to filtered. The inside of each hollow thread is at a lower pressure than the liquid on the outside, so that the filtrate can enter through the porous membrane of the threads while leaving solid matter behind. The open tops of the threads are in communication with an opening in the filter housing through which filtrate, free of solid material, may be removed.

7 Claims, 10 Drawing Figures

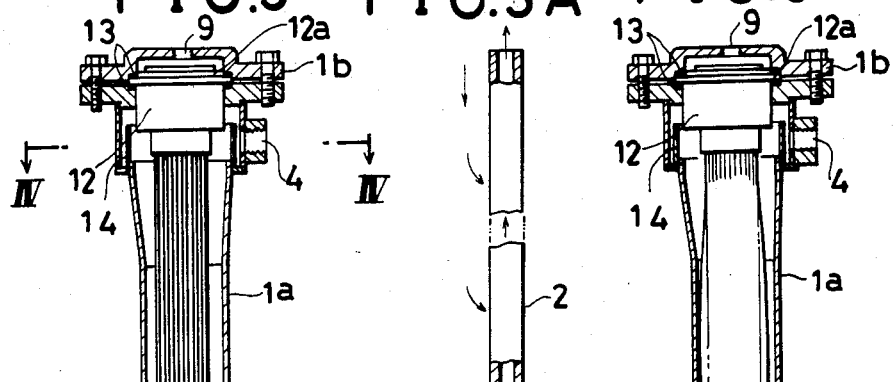
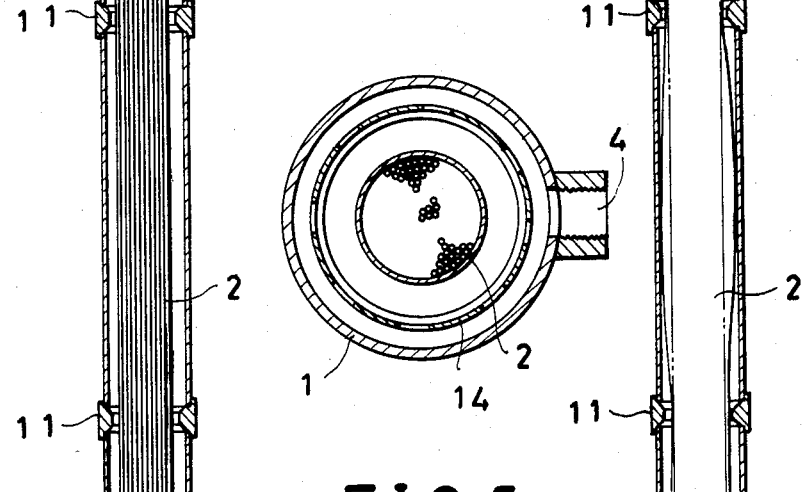
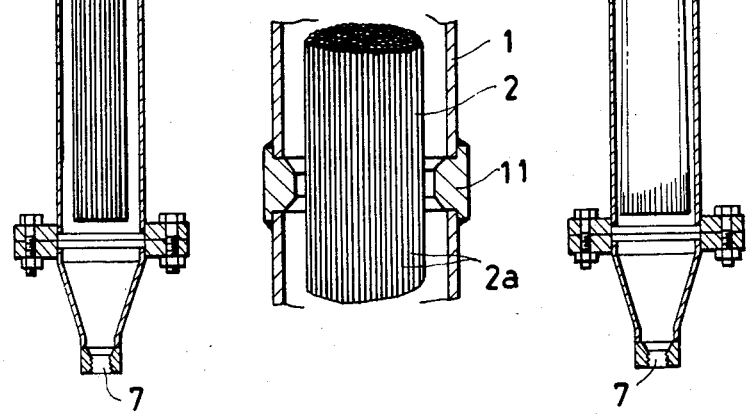

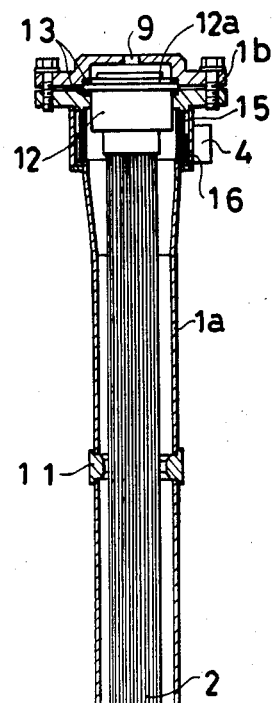
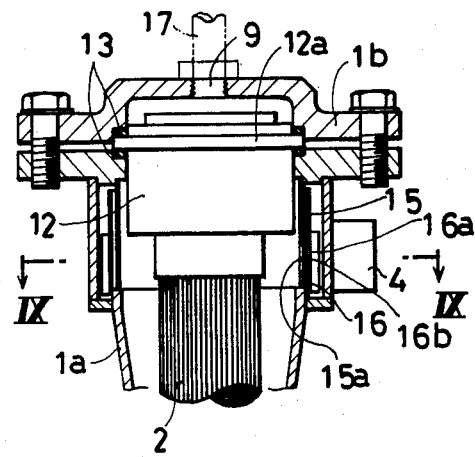
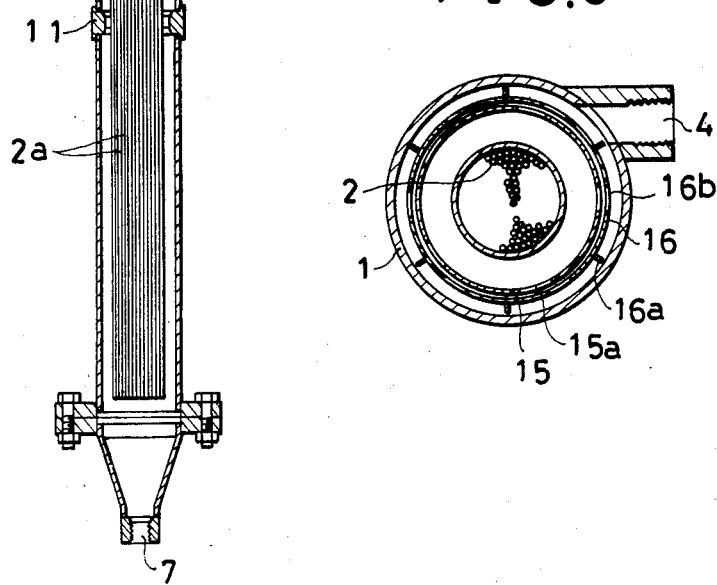

FILTER APPARATUS

FIELD OF THE INVENTION

This invention relates broadly to a filter apparatus for the removal of solid, particulate material from a liquid medium, and more particularly, to an apparatus for filtering used oils having solid particulates dispersed therein.

BACKGROUND OF THE INVENTION

The removal of particulate material from a liquid medium is a necessary step in many industrial operations. A typical example is the removal of solid particulates from various types of oils so that the oil may be reused. The oil to be recycled may, for example, be a lubricating oil, a hydraulic oil, a cutting oil, or an oil used in a steel rolling mill. Cutting oils used for working precious metals such as gold, silver, or platinum become contaminated with fine particles of the precious metal. It is economically imperative that the precious metal be recovered from the used cutting oil.

A filter apparatus for the treatment of used oil which is known in the prior art is disclosed in Japanese Patent Application Publication No. Sho 48-79357. The apparatus disclosed therein comprises a housing having disposed therein a filter medium comprising a plurality of hollow filter elements so arranged that a used oil to be filtered is sent under pressure from the top of the housing to the lower portion by passing through the hollow filter elements.

This apparatus has a number of deficiencies. In order to remove solid particulates adhering to the surfaces of the hollow filter elements of the apparatus, it is necessary to blow compressed air through the filter elements. This results in a low working capacity for the apparatus since the filtering operation has to be suspended while the particulates are being so removed. In addition, the efficiency of the filter medium is gradually lowered with operating time due to becoming plugged with accumulated solids. Moreover, the filter medium elements are likely to be damaged by the compressed air used to remove the solids.

SUMMARY OF THE INVENTION

The filter apparatus of this invention overcomes the deficiencies of the prior art. The apparatus comprises a housing having suspended therein a filter element including a plurality of hollow threads made from a high molecular weight polymeric material. The threads are characterized by being porous and flexible as well as being closed at the bottom. The filter apparatus is further characterized by having at least one baffle within the housing to cause turbulence in the liquid to be filtered. The inside of each hollow thread is at a lower pressure than the liquid on the outside so that filtrate can enter through the porous membranes of the threads while leaving solid matter behind. The open tops of the threads are in communication with an opening in the filter housing through which filtrate, free of solid material, may be removed. A baffle within the filter housing causes turbulence in the liquid to be filtered, resulting in the hollow threads of the filter element undergoing a lateral movement. This lateral movement prevents solid particulates from adhering to the surfaces of the threads of the filter element and plugging them to thereby lower filtering efficiency. The apparatus of the instant invention therefore provides for the efficient removal of solid particulates from a liquid contaminated therewith. Since the filter elements tend not to become plugged with accumulated solids, the filter apparatus has a relatively high working capacity associated with a high rate of filtration.

It is therefore an object of this invention to provide an apparatus for the removal of particulate solids from a liquid contaminated therewith.

It is another object of this invention to provide an apparatus for the recovery of valuable liquids such as lubricating oils and industrial oils.

It is yet another object of this invention to provide an apparatus for the recovery of valuable solids from liquids in which they are dispersed.

It is still another object of this invention to provide a filter apparatus having a high working capacity associated with a high rate of filtration.

The foregoing and other objects are accomplished by the practice of this invention. Broadly, viewed in one of its principal aspects, the filter apparatus of this invention is characterized by a housing adapted to have a liquid to be treated introduced under pressure at the top and directed towards the bottom thereof. A filter element is suspended at its upper end from the top of the housing and is in open communication with an outlet from the housing. The improvement of the present invention includes a plurality of high molecular weight polymeric hollow threads forming the filter element. These threads are open at the top and closed at the bottom. Each thread is porous and flexible, and the interior of each thread is at a lower pressure than the liquid to be treated which is within the housing. At least one baffle is disposed within the housing to cause turbulence in the liquid to be filtered. This turbulence causes the hollow threads of the filter element to constantly move laterally back and forth during the filtration process.

The present invention thus provides an apparatus for removing solid particulates from a liquid medium. The apparatus finds particular utility in the removal of particulate solids from used oils. The filter apparatus is characterized by a high working capacity associated with a high filtration rate. The liquid to be filtered flows turbulently past the hollow threads of the filter element; and liquid filtrate, free from particulate solids, passes through the porous membranes of the threads, into the hollow interiors thereof, and then through the outlet from the filter housing to a collection vessel. The turbulent flow of the liquid to be filtered causes the hollow threads to constantly move laterally back and forth, thereby preventing a build-up or accumulation of solid particulates on the outside of the threads. The hollow threads thus retain their filtering capacity and high filtration rate. Moreover, the filter does not have to be shut down periodically to remove accumulated particulate solids from the outside of the respective hollow threads of the filter element.

The nature and substance of the present invention as well as its objects and advantages will be more clearly perceived and fully understood by referring to the following description and claims taken in connection with the accompanying drawings which are described briefly below.

BRIEF DESCRIPTION OF THE DRAWINGS

FIG. 3 is an enlarged sectional view of the filter element portion thereof.

FIG. 3A is an elevation, partly in section, of one of the hollow threads constituting the filter element, showing the flow of liquid to be filtered.

FIG. 4 is a sectional view, taken along the lines IV—IV in FIG. 3.

FIG. 5 is an enlarged view of a portion of FIG. 3.

FIG. 6 is a sectional side view similar to FIG. 3, but showing another embodiment of the present invention.

FIG. 7 is an enlarged sectional side view of a portion thereof.

FIG. 8 is a sectional view taken along the lines VIII—VIII of FIG. 7.

FIG. 9 is a sectional side view of a portion in FIG. 3, showing an operating mode thereof.

DESCRIPTION OF THE PREFERRED EMBODIMENTS

Figure 1:
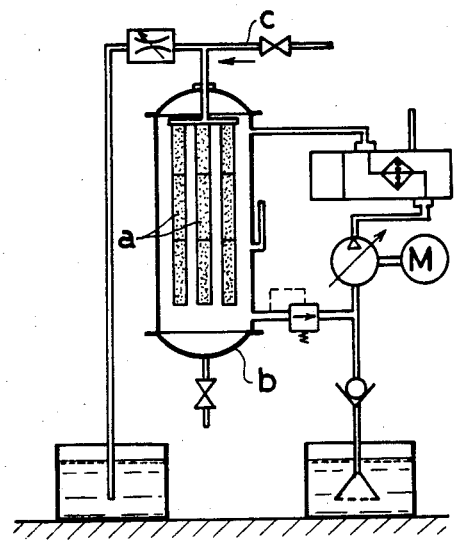
FIG. 1 is a diagrammatic side view of a conventional (prior art) apparatus, partly section and partly in elevation.

The prior art apparatus is illustrated in FIG. 1. This apparatus has been disclosed in Japanese Unexamined Patent Application Publication No. Sho 48-79357. It consists of plural hollow filter medium elements a. The elements are so arranged that a used oil to be treated may be sent under pressure from an upper end portion of the filter housing towards a lower end portion thereof. The used oil passes through the filter elements, and the filtrate (obtained by infiltration through the filter medium elements) may be removed. Some of the foreign matter will adhere to the surfaces of the hollow filter medium elements. Thus, compressed air is supplied through a supply pipe c to the interiors of the hollow portions of the filter medium element in order to remove or blow off the foreign matters therefrom. Accordingly, this conventional apparatus is inconvenient and has a poor working cycle, because the filtration operation must be suspended each time when the foregoing foreign matter is removed from the filter elements. In addition, the filterability of the elements will decrease over operating time, because the foreign materials are gradually accumulated on the surfaces of the filter elements. Moreover, the filter elements are likely to become damaged.

As distinguished from the prior art filter system of FIG. 1, the filter apparatus of the present invention is shown in FIGS. 2-5. A filter housing 1 contains a filter element 2. The top end of the filter element is suspended from the top of filter housing 1. The top of the filter housing is provided with an inlet 4 which is connected by pipe 6 to a liquid tank 3. Pump 5 on pipe 6 forces liquid containing particulate solids from tank 3 under pressure through line 6 into the inlet 4 of the filter housing 1. The bottom of filter housing 1 is connected by pipe 8 to the liquid tank 3, so that a portion of the liquid entering filter housing 1 via inlet 4 may be returned to liquid tank 3 and thus be recirculated through the filter.

Figure 2:
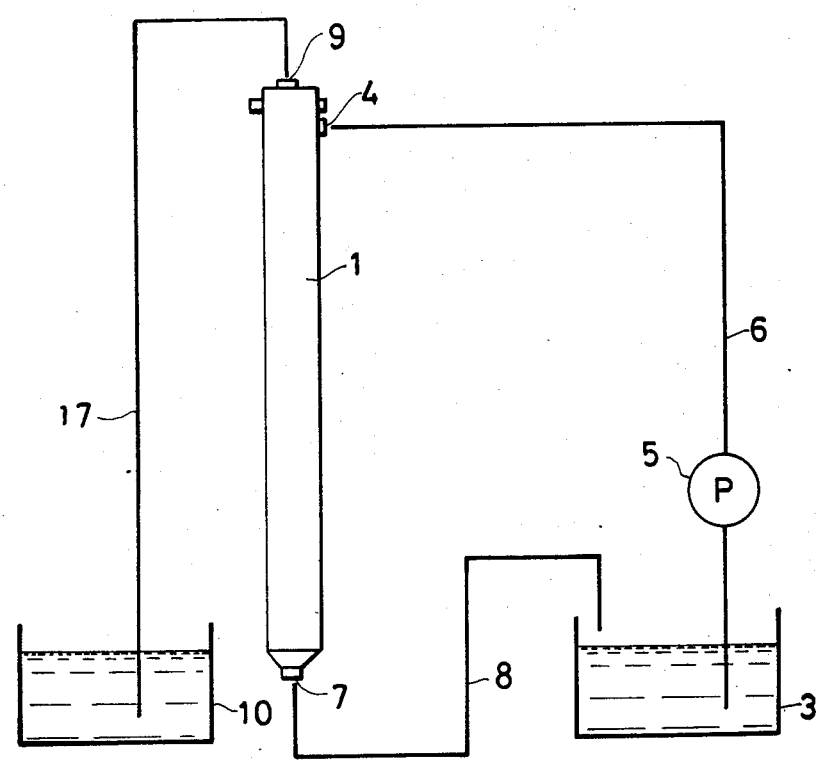
FIG. 2 is a diagrammatical side view of one embodiment of the filter apparatus of the present invention.

The top of the filter element 2 is in open communication with outlet 9 in the top of filter housing 1. Outlet 9 is connected via pipe 17 to a purified liquid tank 10, as shown in FIG. 2. Liquid containing particulate solids which is under pressure inside filter housing 1 passes through filter element 2 while the particulate solids are filtered out. The clear filtrate passes from the filter element 2 through outlet 9 and into purified liquid tank 10 via pipe 17.

With reference to FIGS. 3-5, the filter housing 1 comprises a cylindrical main body and cover 1a removably attached thereto. Filter element 2 comprises a plurality of hollow, porous and flexible threads made from a high molecular weight polymeric material such as polyvinyl alcohol, polyvinyl chloride, polyethylene, polypropylene or the like. Each thread is open at the top and closed at the bottom. Filter element 2 typically contains about 3000 hollow threads which are conveniently about 1 mm. in outer diameter and is about 0.5 mm. in inner diameter. The bundle of individual hollow threads comprising filter element 2 is bound together at the top by collar 12 which has a flange 12a. Flange 12a is held securely between the cylindrical main body of filter housing 1 and removable cover 1a with annular gaskets 13 disposed above and below the flange. Filter element 2 is thus suspended by its top within filter housing 1 and is in open communication with outlet 9 in cover 1a. The interiors of the hollow threads (comprising filter element 2) are at a lower pressure than the liquid (containing particulate solids) to be filtered, which is forced under pressure into the filter housing 1 via inlet 4.

Disposed within filter housing 1 is at least one baffle 11 protruding inwardly from the inner surface of the cylindrical main body thereof. Depending on the length of filter housing 1, it is often advantageous to have two or more such baffles disposed along the intermediate inner surface thereof.

In order to dampen the flow of liquid to be filtered which enters filter housing 1 under pressure via inlet 4, annular baffle 14, having holes therein, is disposed so as to face inlet 4.

In operation, liquid to be filtered enters filter housing 1 under pressure via inlet 4 at the top said filter housing 1. The liquid is driven downward within filter housing 1 and passes over baffles 11. Baffles 11 impart a turbulence to the flow of the liquid to be filtered which in turn causes the hollow threads of filter element 2 to undergo a constant back and forth lateral movement as shown in FIG. 5. Since the interiors of the hollow threads of filter element 2 are at a lower pressure than the liquid to be filtered within filter housing 1, the liquid passes through the substantially cylindrical walls constituting the porous membranes of the threads and into the respective interiors of the threads, as shown by the arrows in FIG. 3A. Particulate solids are thus filtered out of the liquid as it passes through the membranes. The constant lateral back and forth movement of the threads of filter element 2 caused by the turbulent flow induced by baffles 11 prevents particulate solid from accumulating on the outsides of the threads and causing them to become plugged. The filtrate within the hollow threads then passes through the outlet 9 in cover 1a and is collected in a suitable storage tank. Liquid containing particulate solids that is not filtered passes out the bottom of filter housing 1 via outlet 7 and is recycled through the filter.

FIGS. 6-8 illustrate another embodiment of the filter apparatus of the present invention. This embodiment differs from that shown in FIGS. 2-5 in two main respects. In the embodiment of FIGS. 6-8, inlet 4 is so placed on the cylindrical main body of filter housing 1 that liquid to be filtered enters the cylindrical main body essentially tangentially thereof. Further, instead of the single fixed annular baffle 14, shown in the embodiment of FIGS. 2-5, there are a fixed annular baffle 15 and a rotatable annular baffle 16, each of which baffles has holes or openings therein and each of which faces inlet 4. Moreover, rotatable annular baffle 16 is provided with a plurality of blades 16a on its outer face which cause baffle 16 to rotate as said blades come into the flow of liquid entering filter housing 1 tangentially through inlet 4.

This alternate embodiment of the invention will best be understood by reference to FIG. 8. In operation, the liquid to be filtered enters the cylindrical main body of filter housing 1 essentially tangentially via inlet 4. The in-flowing liquid impinges upon blades 16a on the outer face of annular baffle 16, causing baffle 16 to rotate about its axis. Rotatable annular baffle 16 has a plurality of holes or openings 16b at regular intervals about its circumference. Disposed within the circumference of rotatable annular baffle 16 and on a common axis therewith is fixed annular baffle 15. Annular baffle 15 has a plurality of holes or openings 15a disposed at regular intervals about its circumference. It is preferred that the number of holes or openings 16b in rotatable annular baffle 16 be different from the number of holes or openings 15a in fixed annular baffle 15. In a typical arrangement, rotatable annular baffle 16 will have six openings 16b and fixed annular baffle 15 will have five openings 15a. As liquid entering filter housing 1 through inlet 4 impinges upon blades 16a of rotatable annular baffle 16, baffle 16 is caused to rotate about its axis and the degree of alignment of openings 16b and 15a gradually and continuously changes. Accordingly, the rate of flow of liquid to be filtered entering filter housing 1 from inlet 4 is constantly changing, thereby enhancing continuous lateral back and forth movement of the threads of filter element 2.

Thus, the instant invention provides an apparatus for the continuous and efficient removal of particulate solids from liquids containing said solids. The apparatus is characterized by a filter element comprised of a plurality of high molecular weight polymeric hollow, porous and flexible threads that are closed at the bottom and open at the top. The apparatus is further characterized by one or more baffles inside the filter housing which impart turbulence to the liquid to be filtered. The turbulence of the liquid causes the threads of the filter element to continuously move back and forth laterally so that as liquid, free from particulate solids, enters the hollow threads of the filter element through the porous membranes thereof. The constant lateral movement prevents the particulate solids from adhering and accumulating on the outside of said threads. Fouling and plugging of the filter element is thereby prevented, and the filter of this invention accordingly has a high working capacity associated with a high rate of filtration.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadest extent that the prior art allows.

What is claimed is:

1. In a filter apparatus comprising a cylindrical housing adapted to have a liquid to be filtered introduced under pressure at the top and directed towards the bottom thereof, and wherein a filter element is suspended at its upper end from the top of said housing, said filter element being in open communication with an outlet from said housing, the improvement comprising:
   a. said filter element comprising a plurality of high molecular weight polymeric hollow threads, said threads being open at the top and closed at the bottom and, further, being porous and flexible, and wherein the interior of each thread is at a lower pressure than the liquid to be treated which is within said housing;
   b. at least one baffle disposed within said housing and protruding inwardly from the inner surface thereof to cause turbulence in said liquid to be filtered, said turbulence causing said hollow threads of said filter element to constantly move laterally back and forth during the filteration process;
   c. means defining an inlet for introducing liquid to be treated into the top of said cylindrical housing essentially tangentially to the inner surface thereof;
   d. a rotatable annular baffle having blades on its outer face and means defining a plurality of openings at regular intervals about its circumference, said rotatable annular baffle being so disposed within said cylindrical housing as to be caused to rotate about its axis by impingement of the stream of liquid entering said housing upon said blades; and
   e. a fixed annular baffle within the circumference of said rotatable annular baffle and on a common axis therewith, said fixed annular baffle having means defining a plurality of openings at regular intervals about its circumference.

2. The filter apparatus of claim 1, wherein said hollow threads comprising the filter element are bound together at the top by a collar having a flange around its periphery, and wherein said housing comprises a cylindrical main body and an upper removable cover, said flange being held firmly between said cylindrical main body and said removable cover, whereby said filter element is suspended from the top of said housing.

3. The filter apparatus of claim 2, wherein the cylindrical main body of said housing has two baffles protruding inwardly from the inner surface thereof, one said baffle being disposed in the upper half, and the other said baffle being disposed in the lower half of said cylindrical main body.

4. The filter apparatus of claim 3, wherein said high molecular weight polymeric hollow threads are comprised of polyvinyl alcohol.

5. The filter apparatus of claim 3, wherein said filter element comprises about 3000 hollow threads, and wherein each said thread has an outer diameter of about 1 millimeter and an inner diameter of about 0.5 millimeter.

6. The filter apparatus of claim 3, wherein the number of openings about the circumference of said rotatable annular baffle is different from the number of openings about the circumference of said fixed annular baffle.

7. The filter apparatus of claim 6, wherein the number of openings about the circumference of said rotatable annular baffle is greater than the number of openings about the circumference of said fixed annular baffle.

* * * * *